(12) United States Patent
Ben Sultan et al.

(10) Patent No.: US 11,566,715 B1
(45) Date of Patent: Jan. 31, 2023

(54) PREVENTING AN OVER PRESSURE CONDITION WITH A MECHANICAL SHUTDOWN VALVE

(71) Applicant: Saudi Arabian Oil Company, Dhahran (SA)

(72) Inventors: Melhan M. Ben Sultan, Dhahran (SA); Mohamd S. Almansour, Dhahran (SA); Seung-Hak Choi, Dhahran (SA); Yasser A. Shalabi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/368,528

(22) Filed: Jul. 6, 2021

(51) Int. Cl.
*F16K 7/14* (2006.01)
*G05D 7/01* (2006.01)
*F16K 31/126* (2006.01)

(52) U.S. Cl.
CPC ............ *F16K 7/14* (2013.01); *F16K 31/1262* (2013.01); *G05D 7/012* (2013.01); *Y10T 137/7835* (2015.04); *Y10T 137/7869* (2015.04)

(58) Field of Classification Search
CPC ....... F16K 7/14; F16K 31/1262; G05D 7/012; Y10T 137/7835; Y10T 137/7836; Y10T 137/7869
USPC ......................................... 137/509, 510, 517
See application file for complete search history.

(56) References Cited

U.S. PATENT DOCUMENTS

| 922,578 | A | | 5/1909 | Gries | |
|---|---|---|---|---|---|
| 2,136,898 | A | * | 11/1938 | Thomas | F16T 1/12 137/517 |
| 2,585,575 | A | | 2/1952 | Richard | |
| 2,662,477 | A | * | 12/1953 | Robinson | F23K 5/04 417/303 |
| 2,819,799 | A | * | 1/1958 | Wilkerson | F16T 1/12 251/210 |
| 2,867,234 | A | * | 1/1959 | Billington | G05D 16/0683 137/505.46 |
| 3,151,839 | A | | 10/1964 | Mott | |
| 3,351,088 | A | * | 11/1967 | Jensen | A61M 16/0051 137/557 |
| 3,406,715 | A | * | 10/1968 | Hruby, Jr. | A01G 25/06 137/550 |
| 3,482,603 | A | | 12/1969 | Outcalt | |
| 3,763,840 | A | | 10/1973 | Schimmelpfenig | |

(Continued)

FOREIGN PATENT DOCUMENTS

WO  WO-2019209239 A1 * 10/2019 ............. B01D 61/00

*Primary Examiner* — William M McCalister
(74) *Attorney, Agent, or Firm* — Fish & Richardson P.C.

(57) ABSTRACT

A mechanical shutdown valve for preventing an over pressure condition is described. A valve body has an inlet, an outlet, and a channel extending from the inlet to the outlet. A valve seat and a diaphragm are positioned in the valve body. The diaphragm controls a fluid flow through the valve body. A mesh is coupled to the diaphragm such that the mesh and the diaphragm separate an upstream portion of the channel from a downstream portion of the channel. The mesh extends from the diaphragm to an inner surface of the valve body and limits fluid flow between the diaphragm and the valve body. A spring biases the diaphragm towards the open position. A characteristic of the spring determines a differential pressure threshold between the upstream portion of the channel and a downstream portion of the channel at which the diaphragm engages the valve seat.

16 Claims, 6 Drawing Sheets

(56) References Cited

U.S. PATENT DOCUMENTS

| | | | |
|---|---|---|---|
| 3,817,278 A | 6/1974 | Elliott | |
| 3,837,362 A * | 9/1974 | Barnes | F15D 1/02 138/45 |
| 4,137,756 A * | 2/1979 | Cosack | B01D 67/0041 210/456 |
| 4,141,379 A * | 2/1979 | Manske | F16K 15/144 137/859 |
| 4,244,526 A * | 1/1981 | Arth | B05B 15/654 239/533.1 |
| 4,564,483 A * | 1/1986 | Jeans | B01F 23/2362 137/859 |
| 4,699,166 A * | 10/1987 | Gold | F16K 17/30 137/498 |
| 4,842,198 A * | 6/1989 | Chang | A01G 25/16 239/570 |
| 4,890,640 A * | 1/1990 | King, Sr. | F16K 51/00 137/550 |
| 5,159,981 A | 11/1992 | Le | |
| 5,215,113 A * | 6/1993 | Terry | F16K 17/30 137/460 |
| 5,269,335 A * | 12/1993 | Heitman | G01V 1/133 137/12 |
| 5,514,110 A * | 5/1996 | Teh | A61M 5/16881 604/249 |
| 5,551,476 A * | 9/1996 | McGinnis | F16K 17/30 137/498 |
| 5,694,977 A * | 12/1997 | Clark | F16K 17/042 137/505.13 |
| 6,017,459 A * | 1/2000 | Zeiher | G01N 17/008 210/85 |
| 6,019,115 A * | 2/2000 | Sanders | F16K 17/30 137/460 |
| 6,062,247 A * | 5/2000 | King, Sr. | F16K 15/023 137/71 |
| 6,270,055 B1 | 8/2001 | Szeteli et al. | |
| 6,374,852 B1 | 4/2002 | Olivas | |
| 6,443,180 B1 | 9/2002 | Samuelson et al. | |
| 6,463,790 B1 * | 10/2002 | Chun | G01N 15/0826 73/61.73 |
| 10,240,431 B2 | 3/2019 | Caminari et al. | |
| 2007/0261734 A1 * | 11/2007 | Maus et al. | F16K 17/40 137/74 |
| 2008/0035215 A1 | 2/2008 | Loper | |
| 2010/0154902 A1 * | 6/2010 | Loper | F15B 13/023 137/517 |
| 2011/0147016 A1 * | 6/2011 | Blease | A62C 35/68 137/517 |
| 2012/0160347 A1 * | 6/2012 | Laude | F16K 17/30 73/40.5 R |

* cited by examiner

PREVENTING AN OVER PRESSURE CONDITION WITH A MECHANICAL SHUTDOWN VALVE

TECHNICAL FIELD

This disclosure relates to mechanical shutdown valves.

BACKGROUND

Test assemblies can be used to perform an analysis of condition of a test article. Some test assemblies use a pressure source to flow a pressurized fluid to and/or through the test article to perform the analysis of the condition of the test article. Test assemblies include test instruments to analyze the condition of the test article when the pressurized fluid is flowed to and/or through the test article. Test instruments can become damaged when a pressure of the pressurized fluid exceeds a pressure threshold of the test instruments. Test articles can be damaged during the performance of some analyses, resulting in the pressurized fluid to flow unimpeded to the test instruments. When the pressure of the pressurized fluid flow through the test article to the test instrument exceeds the pressure threshold of the test instrument, the test instrument can become damaged.

SUMMARY

This disclosure describes technologies related to preventing an overpressure condition with a mechanical shutdown valve.

The mechanical shutdown valve has a valve body with an inlet, an outlet, and a channel extending from the inlet to the outlet. A valve seat and a diaphragm are positioned in the valve body. The diaphragm moves between an open position spaced apart from the valve seat to allow a fluid flow through the valve body and a closed position engaging the valve seat to stop the fluid flow through the valve body.

The mechanical shutdown valve can have a mesh coupled to the diaphragm such that the mesh and the diaphragm separate an upstream portion of the channel from a downstream portion of the channel. The mesh extends from the diaphragm to an inner surface of the valve body. The mesh limits fluid flow between the diaphragm and the valve body. The mechanical shutdown valve has a spring biasing the diaphragm towards the open position. The spring determines a differential pressure threshold between the upstream portion of the channel and a downstream portion of the channel at which the diaphragm engages the valve seat. When the diaphragm engages the valve seat and the fluid flow is stopped through the valve body, the test instruments can be protected and the release of the pressurized fluid to the environment can be prevented.

Test assemblies can be used to perform an analysis of condition of a test article, for example the permeability of a membrane. Some test assemblies use a pressure source to flow a pressurized fluid to and/or through the membrane to analyze the permeability of the membrane. Test assemblies include test instruments such as a gas chromatograph and/or a mass flow meter to analyze the permeability of the membrane. The gas chromatograph and the mass flow meter can become damaged when a pressure of the pressurized fluid exceeds a pressure threshold of the gas chromatograph and mass flow meter. During the performance of some of the analyses, the membrane can be can become damaged. For example, pinhole leaks can form in the membrane, the membrane can thin, the membrane can rupture or break, and/or the membrane can thermally degrade, all of which can increase the pressure of the fluid and/or a flow rate of the fluid to the test instruments. When the pressure of the pressurized fluid flow through the membrane to the test instruments exceeds the pressure threshold of the test instruments, the test instruments can become damaged.

Test assemblies can include a pressure relief valve in the fluid flow between the membrane and the gas chromatograph and/or the mass flow meter to protect the gas chromatograph and/or the mass flow meter from the pressure of the pressurized fluid exceeding the pressure threshold of the gas chromatograph and/or the mass flow meter. The pressure relief valve can vent the pressurized fluid to an atmosphere, resulting in a loss of the pressurized fluid from the test assembly. Sometimes, the pressurized fluid is hazardous to personnel or the environment. In order to protect the test instruments and prevent the release of the pressurized fluid to the environment, the mechanical shutdown valve is positioned downstream from the membrane, between the membrane and the test instruments.

In one aspect, shutdown valves include: a valve body having an inlet, an outlet, and a channel extending from the inlet to the outlet; a valve seat positioned in the valve body; a diaphragm positioned in the valve body, the diaphragm is movable between an open position spaced apart from the valve seat to allow a fluid flow through the valve body and a closed position engaging the valve seat to stop the fluid flow through the valve body; a mesh coupled to the diaphragm such that the mesh and the diaphragm separate an upstream portion of the channel from a downstream portion of the channel, the mesh extending from the diaphragm to an inner surface of the valve body and limiting fluid flow between the diaphragm and the valve body; and a spring biasing the diaphragm towards the open position, wherein a characteristic of the spring determines a differential pressure threshold between the upstream portion of the channel and a downstream portion of the channel at which the diaphragm engages the valve seat. Embodiments of these valves can include one or more of the following features.

In some embodiments, shutdown valves include a mount coupled to the inner surface of the valve body and the mesh, the mount movable along the inner surface of the valve body. In some cases, the mount comprises a roller disposed in a track defined in the inner surface of the valve body. In some cases, the mount comprises a guide rail positioned on the inner surface of the valve body.

In some embodiments, the diaphragm compresses the spring to move from the open position to the closed position.

In some embodiments, the characteristic of the spring is one of at least a spring constant, a spring length, or a spring material. In some cases, the characteristic of spring is adjustable.

In some embodiments, the spring moves the diaphragm from the closed position to the open position when a differential pressure across the mesh is less than the differential pressure threshold.

In some embodiments, the spring includes a set of springs, wherein each of spring of the set of springs determines a different differential pressure threshold.

In some embodiments, the mesh is a first mesh and a first end of the spring is coupled to the diaphragm, the shutdown valve further comprises a second mesh, the second mesh fixed to the valve seat and a second end of the spring.

In some embodiments, the valve seat comprises a tube positioned in the valve body, the diaphragm stopping the fluid flow through the valve body when the diaphragm contacts the tube. In some cases, the spring is positioned inside the tube. In some cases, valves include a second mount coupling the tube to the valve body. Moving the tube by the second mount can adjusts a length of the spring.

In another aspect, membrane test assemblies include: a pressure source to flow a fluid; a membrane test cell fluidly coupled to the pressure source receive the fluid and to hold a membrane; a test instrument fluidly coupled to an outlet of the membrane test cell to perform a test on a membrane; and a mechanical shutdown valve positioned in between the membrane test cell and the test instrument, the mechanical shutdown valve configured to stop a fluid flow to the test instrument when a differential pressure created by the fluid flow through the mechanical shutdown valve is greater than or equal to a differential pressure threshold.

In some embodiments, mechanical shutdown valves include: a valve body having an inlet, an outlet, and a channel extending from the inlet to the outlet; a valve seat positioned in the valve body; a diaphragm positioned in the valve body, the diaphragm is movable between an open position spaced apart from the valve seat to allow a fluid flow through the valve body and a closed position engaging the valve seat to stop the fluid flow through the valve body; and a spring biasing the diaphragm towards the open position, wherein a characteristic of the spring determines a differential pressure threshold between an upstream portion of the channel and a downstream portion of the channel at which the diaphragm engages the valve seat. In some cases, mechanical shutdown valves include a mesh coupled to the diaphragm such that the mesh and the diaphragm separate an upstream portion of the channel from a downstream portion of the channel, the mesh extending from the diaphragm to an inner surface of the valve body and limiting fluid flow between the diaphragm and the valve body. In some cases, the mesh is a first mesh and the mechanical shutdown valve includes: a first mount coupled to the inner surface of the valve body and the first mesh, the first mount movable along the inner surface of the valve body; and a second mount coupled to the inner surface of the valve body and the valve seat comprising a tube, wherein the spring is positioned in the tube and coupled to the tube by a second mesh.

In some embodiments, the spring is a plurality of springs coupled to a first surface of the diaphragm.

In some embodiments, the spring includes: a first spring coupled to a first surface of the diaphragm; and a second spring coupled to a second surface of the diaphragm, wherein a length of the second spring changes by a rotatable cap positioned on an outer surface of the valve body.

Implementations of the present disclosure can realize one or more of the following advantages. Shutdown valves can maintain test instrument integrity and proper operation. For example, when the fluid pressure at the test instrument exceeds the pressure threshold, the test instrument can become damaged. Stopping the pressurized fluid flow to the test instrument can protect the test instrument from becoming damaged. A loss of test fluid can be prevented. For example, when an over pressure condition occurs and a pressure relief valve operates to protect the test instrument, the loss of the pressurized fluid from the test assembly can occur. The mechanical shutdown valve can prevent the loss of the pressurized fluid from the test assembly. Environmental safety and personnel safety can be improved. For example, during the operation of the test assembly to perform the analysis, the membrane can become damaged. A release of the pressurized fluid, when the pressurized fluid is hazardous, can harm the environment or cause personnel injury. Stopping the pressurized fluid flow out of the pressure relief valve can preventing the release of the pressurized fluid to the environment or in the proximity to personnel, thus improving environmental and personnel safety. Shutdown valves can reduce experiment time. For example, when the pressurized fluid is prevented from exiting the test assembly, the new additional pressurized fluid does not need to be subsequently added to the test assembly. Additional time required to refill the test assembly is avoided. Shutdown valves can reduce wasted pressurized fluid. For example, when the pressurized fluid is prevented from exiting the test assembly, it can become contaminated by the environment and in some instances, can no longer be used again in the test assembly. Preventing the pressurized fluid from exiting the test assembly reduces waste of the pressurized fluid.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
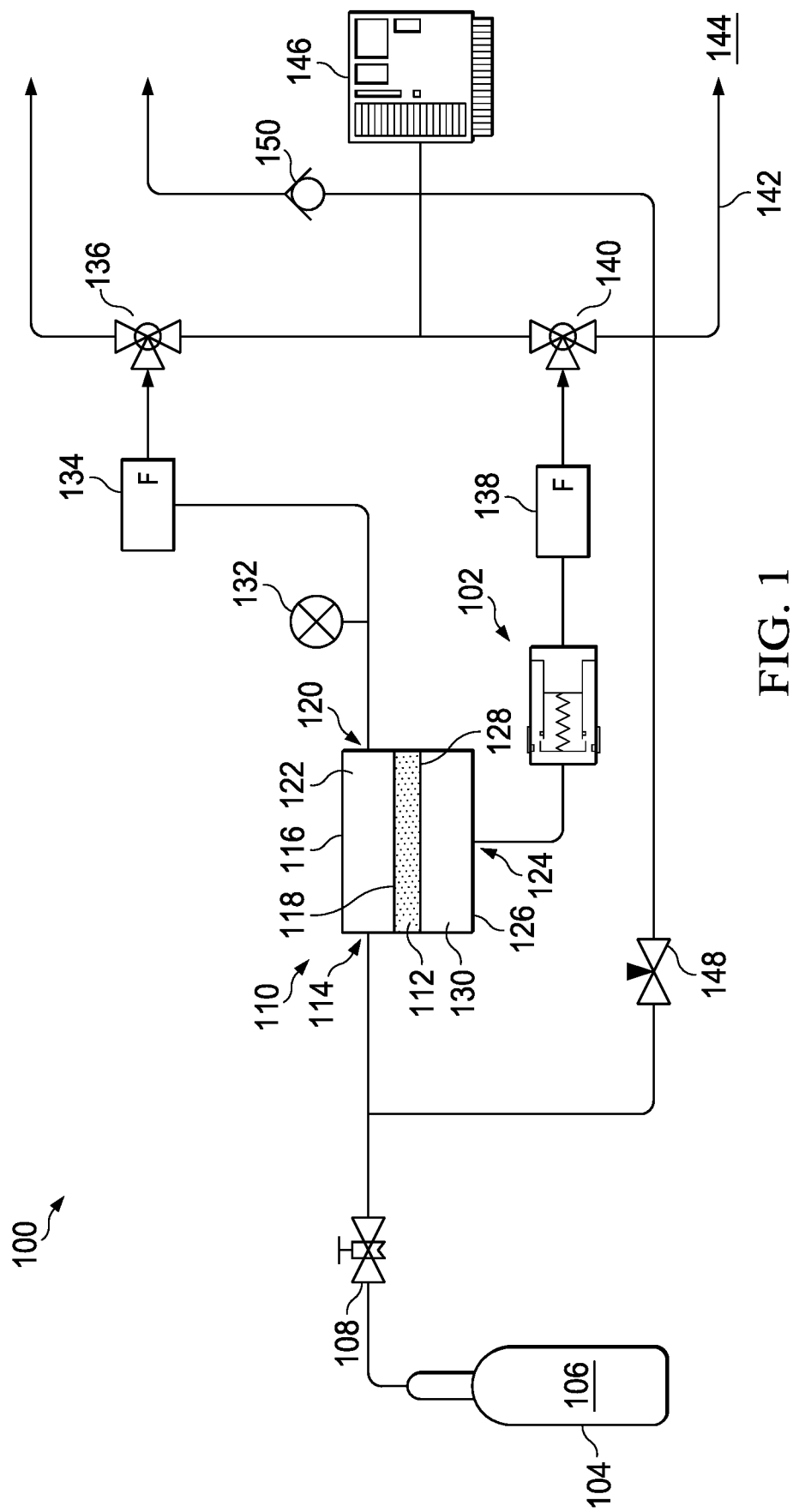
FIG. 1 is a schematic view of a membrane test assembly with a mechanical shutdown valve.

The present disclosure relates to preventing an over pressure condition with a mechanical shutdown valve.

The mechanical shutdown valve has a valve body with an inlet, an outlet, and a channel extending from the inlet to the outlet. A valve seat and a diaphragm are positioned in the valve body. The diaphragm moves between an open position spaced apart from the valve seat to allow a fluid flow through the valve body and a closed position engaging the valve seat to stop the fluid flow through the valve body.

The mechanical shutdown valve can have a mesh coupled to the diaphragm such that the mesh and the diaphragm separate an upstream portion of the channel from a downstream portion of the channel. The mesh extends from the diaphragm to an inner surface of the valve body. The mesh limits fluid flow between the diaphragm and the valve body. The mechanical shutdown valve has a spring biasing the diaphragm towards the open position. The spring determines a differential pressure threshold between the upstream portion of the channel and a downstream portion of the channel at which the diaphragm engages the valve seat. When the diaphragm engages the valve seat and the fluid flow is stopped through the valve body, the test instruments can be protected and the release of the pressurized fluid to the environment can be prevented.

Test assemblies can be used to perform an analysis of condition of a test article, for example, the permeability of a membrane. Some test assemblies use a pressure source to flow a pressurized fluid to and/or through the membrane to analyze the permeability of the membrane. Test assemblies include test instruments such as a gas chromatograph and/or a mass flow meter to analyze the permeability of the membrane. The gas chromatograph and the mass flow meter can become damaged when a pressure of the pressurized fluid exceeds a pressure threshold of the gas chromatograph and mass flow meter. During the performance of some of the analyses, the membrane can be can become damaged. For example, pinhole leaks can form in the membrane, the membrane can thin, the membrane can rupture or break, and/or the membrane can thermally degrade, all of which can increase the pressure of the fluid and/or a flow rate of the fluid to the gas chromatograph and/or the mass flow meter. When the pressure of the pressurized fluid flow through the membrane to the gas chromatograph and/or the mass flow meter exceeds the pressure threshold of the gas chromatograph and/or the mass flow meter, the gas chromatograph and/or the mass flow meter can be damaged.

Test assemblies can include a pressure relief valve in the fluid flow between the membrane and the gas chromatograph and/or the mass flow meter to protect the gas chromatograph and/or the mass flow meter from the pressure of the pressurized fluid exceeding the pressure threshold of the gas chromatograph and/or the mass flow meter. The pressure relief valve can vent the pressurized fluid to an atmosphere, resulting in a loss of the pressurized fluid from the test assembly. Sometimes, the pressurized fluid is hazardous to personnel or the environment. For example, pure gases, vapors, and chemical mixtures can be hazardous. In order to protect the test instruments and prevent the release of the pressurized fluid to the environment through the pressure relief valve, the mechanical shutdown valve is positioned downstream from the membrane, between the membrane and the pressure relief valve and the test instruments.

In some implementations of the present disclosure, a membrane test assembly has a pressure source to flow a fluid, a membrane test cell fluidly coupled to the pressure source receive the fluid and to hold a membrane, a test instrument fluidly coupled to an outlet of the membrane test cell to perform a test on a membrane, and a mechanical shutdown valve positioned in between the membrane test cell and the test instrument. The mechanical shutdown valve stops a fluid flow to the test instrument when a differential pressure created by the fluid flow through the mechanical shutdown valve is greater than or equal to a differential pressure threshold. The mechanical shutdown valve has a valve body having an inlet, an outlet, and a channel extending from the inlet to the outlet. The mechanical shutdown valve has a valve seat positioned in the valve body and a diaphragm positioned in the valve body. The diaphragm moves between an open position spaced apart from the valve seat to allow a fluid flow through the valve body and a closed position engaging the valve seat to stop the fluid flow through the valve body. The mechanical shutdown valve has a spring biasing the diaphragm towards the open position. A characteristic of the spring determines a differential pressure threshold between an upstream portion of the channel and a downstream portion of the channel at which the diaphragm engages the valve seat.

FIG. 1 is a schematic view of a membrane test assembly 100 with a mechanical shutdown valve 102. The membrane test assembly 100 can be operated as a constant pressure assembly, a constant volume assembly, or a permeation membrane analyzer assembly depending on the type of analysis to be performed. As shown in FIG. 1, the membrane test assembly 100 is configured to perform a constant pressure operation. The mechanical shutdown valve 102 stops a fluid flow when a differential pressure created by the fluid flow through the mechanical shutdown valve 102 is greater than or equal to a differential pressure threshold.

Figure 2:
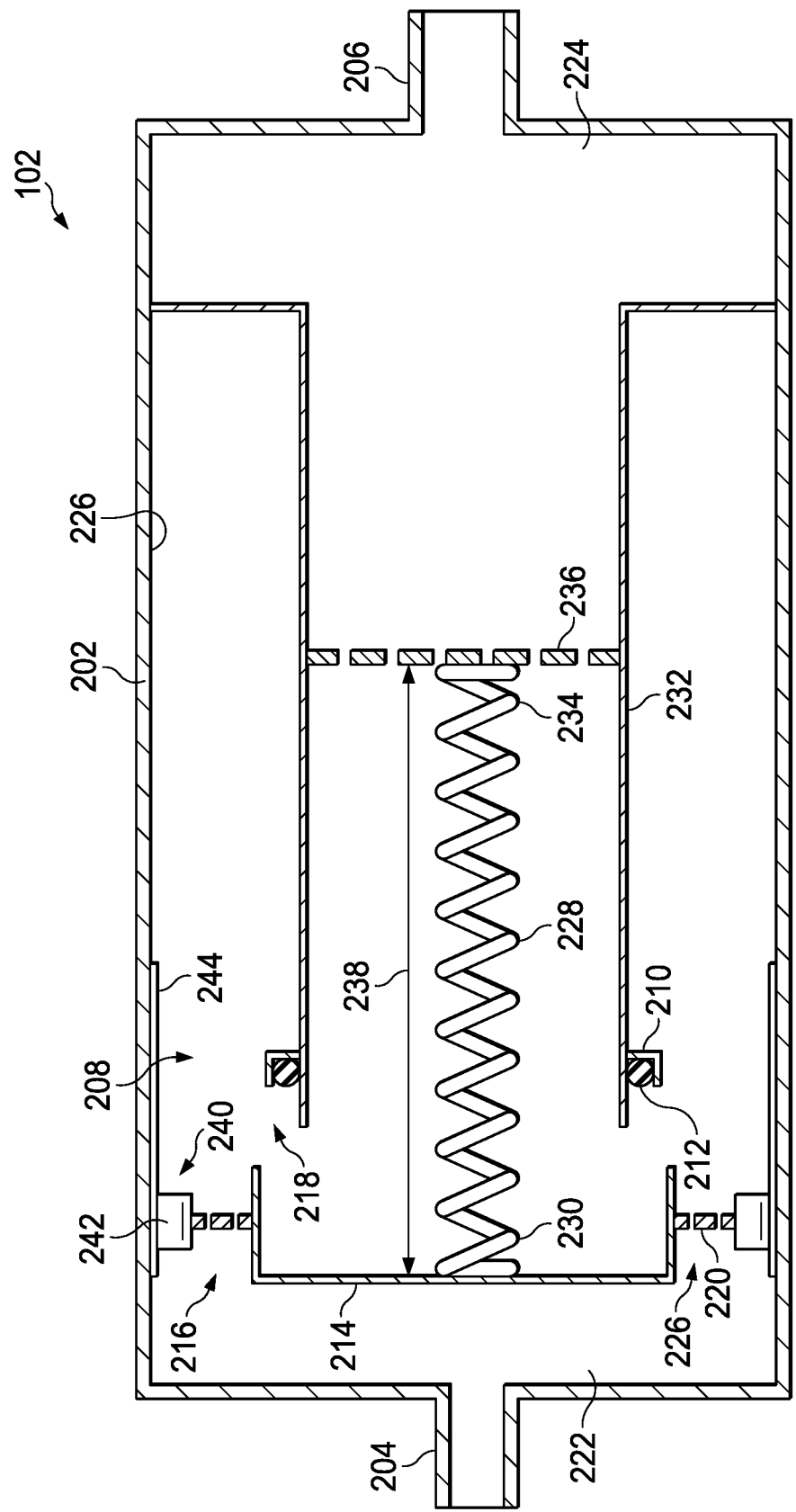
FIG. 2 is a schematic view of the mechanical shutdown valve of FIG. 1.

FIG. 2 is a schematic view of the mechanical shutdown valve 102. In some cases, the mechanical shutdown valve 102 can be referred to as a shutdown valve or a mechanical spring shutdown valve. The shutdown valve 102 has a valve body 202.

The shutdown valve 102 has an inlet 204 which is connected to the valve body 202. Referring to FIGS. 1 and 2, the inlet 204 is connected to the outlet portion 126 of the membrane test cell 110. The inlet 204 conducts the pressurized fluid 106 into the valve body 202. The shutdown valve 102 has an outlet 206 which is also connected to the valve body 202. Referring to FIGS. 1 and 2, the outlet 206 is connected to the mass flow meter 138. The outlet 206 conducts the pressurized fluid 106 out of the valve body 202. The valve body 202 defines a channel extending through the valve body 202 from the inlet 204 to the outlet 206. The channel 208 conducts the pressurized fluid 106 through the valve body 202.

The shutdown valve 102 has a diaphragm 214 and a valve seat 210 positioned in the valve body 202. The diaphragm 214 and the valve seat 210 control the flow of the pressurized fluid 106 through the valve body 202. The valve seat 210 can include an O-ring 212. The O-ring 212 is a sealing surface. The valve seat 210 can include a tube 232. The tube 232 can be coupled to the valve body 202 to position the O-ring 212 in the channel 208.

The diaphragm 214 is movable between an open position 216 spaced apart from the valve seat 210 to allow a fluid flow through the valve body 202 and a closed position 218 engaging the valve seat 210 to stop the pressurized fluid 106 flow through the valve body 202. The diaphragm 214 seals the pressurized fluid 106 flow by engaging the O-ring 212.

The shutdown valve 102 has a mesh 220 connected to the diaphragm 214. The flow of the pressurized fluid 106 through the mesh 220 generates a differential pressure across the mesh 210 to move the diaphragm 220. The mesh 220 is coupled to the diaphragm 214. For example, the mesh 220 can be welded or fastened to the diaphragm 214 with a fastener (not shown). The mesh 220 is coupled to the diaphragm 214 such that the mesh 220 and the diaphragm 214 separate an upstream portion 222 of the channel 208 from a downstream portion 224 of the channel 208. The mesh 220 extends from the diaphragm 214 to an inner surface 226 of the valve body 202. The mesh 220 defines pores 246 (which can also be referred to as openings or holes). The pores 246 limit the pressurized fluid 106 flow between the diaphragm 214 and the valve body 202. In some cases, the mesh 220 is an assembly of wires, that is, a wire mesh. The mesh 220 can be a mesh plate. The mesh 220 can be stainless steel.

The pressurized fluid 106 flows through the mesh 220 (the pores 246) which generates a differential pressure across the mesh 220. The differential pressure across the mesh 220 moves the diaphragm 214 from the open position 216 spaced apart from the valve seat 210 to allow the pressurized fluid 106 flow through the valve body 202 to the closed position 218 engaging the valve seat 210 to stop the pressurized fluid 106 flow through the valve body 202.

The shutdown valve 102 has a spring 228. The spring 228 is positioned in the valve body 202. The spring 228 can be positioned inside the tube 232. A first end 230 of the spring 228 is coupled to the diaphragm 214. A second end 234 of the spring 228 is coupled to the tube 232 by another mesh 236. The other mesh 236 is generally similar to the mesh 220. The mesh 236 supports the spring 228 in the tube 232. The spring 228 biases the diaphragm 214 towards the open position 216. The diaphragm 214 compresses the spring 228 to move from the open position 216 to the closed position 218 when the differential pressure across the mesh 220 is greater than or equal to the differential pressure threshold. The spring 228 can move the diaphragm 214 from the closed position 218 to the open position 216 when the differential pressure across the mesh 220 is less than the differential pressure threshold.

A characteristic of the spring 228 determines a differential pressure threshold between the upstream portion 222 of the channel 208 and the downstream portion 224 of the channel 208 at which the diaphragm 214 engages the valve seat 210. The characteristic of the spring 228 can be a spring constant, a spring length 238, or a spring material. The spring 228 can include a set of springs 228. Each of spring 228 of the set of springs 228 can have a different characteristic to determine a different differential pressure threshold. For example, each spring 228 of the set of springs 228 can have a different length 238.

The shutdown valve 102 has a mount 240 coupled to the inner surface 226 of the valve body 202 and the mesh 220. The mount 240 is movable along the inner surface 226 of the valve body 202. In some implementations, the mount 240 is a roller 242 disposed in a track 244 defined in the inner surface 226 of the valve body 202. In some cases, the mount is a guide rail. A guide rail extends from the inner surface 226 of the valve body 202. The guide rail can control movement of the diaphragm 214.

Referring to FIG. 1, the membrane test assembly 100 has a pressure source 104. The pressure source 104 contains a fluid 106. For example, the pressure source 104 can be a pressurized gas cylinder. In some cases, the fluid 106 can be pressurized by the pressure source 104. For example, the pressure source 104 can include a compressor such a piston to pressurize the fluid 106. The fluid 106 is pressurized to flow the fluid 106 through the membrane test assembly 100. The fluid 106 can be pressurized between 100 psig and 1500 psig.

The fluid 106 can be a liquid or a gas. For example, a liquid can be water, a solvent, or an emulsion of oil and water. For example, a gas can be an oxidizer gas, an inert gas, or flammable gases, vapors, or mixtures of these gases.

The membrane test assembly 100 has a pressure control valve 108. The pressure control valve 108 receives the pressurized fluid 106 from the pressure source 104. The pressure control valve 108 controls the flow of the fluid 106 through the membrane test assembly 100. For example, the pressure control valve 108 can be one or more of a pressure reducing valve, a gate valve, or a globe valve.

The membrane test assembly 100 has a membrane test cell 110. The membrane test cell 110 holds a membrane 112. The membrane test cell 110 can be open and closed to place the membrane 112 inside of the membrane test cell 110. The membrane test cell 110 is a pressure vessel.

The membrane 112 can be a polymeric membrane. A polymeric membrane is a thin material or film made of dissolved polymers. The polymeric membrane is selectively permeable to certain species (chemical) in a given phase (for example, a gas). As such, various membranes 112 are continually tested to analyze their respective mass transport properties and separation performance for various gaseous and liquid species in contact with the membrane 112.

The membrane test cell 110 has an inlet 114. The inlet 114 of the membrane test cell 110 is fluidly coupled to the pressure source 104 and the pressure control valve 108. The inlet 114 is coupled to an inlet portion 116 of the membrane test cell 110. The inlet portion 116 of the membrane test cell 110 conducts the pressurized fluid 106 to a first surface 118 of the membrane 112. The first surface 118 of the membrane 112 receives the pressurized fluid 106.

The inlet portion 116 of the membrane test cell 110 includes a first outlet 120. The first outlet 120 conducts a retentate 122, that is, a portion of the pressurized fluid 106 which does not flow through the membrane 112, out of the inlet portion 116.

The membrane test cell 110 has a second outlet 124. The second outlet 124 of the membrane test cell 110 is fluidly coupled to the mechanical shutdown valve 102. The second outlet 124 is coupled to an outlet portion 126 of the membrane test cell 110. The outlet portion 126 of the membrane test cell 110 receives the pressurized fluid 106 from a second surface 128 of the membrane 112. The outlet portion 126 contains the permeate 130, that is, a portion of the pressurized fluid 106 which flowed through the membrane 112. The second outlet 124 conducts the permeate 130 out of the outlet portion 126 and to the mechanical shutdown valve 102.

The membrane test assembly 100 has a pressure sensor 132. The pressure sensor 132 is fluidly coupled to the first outlet 120. The pressure sensor 132 measure the pressure of the retentate 122. The pressure sensor 132 monitors, measures, and records the pressure of the membrane test assembly 100 system to analyze the membrane performance.

The membrane test assembly 100 includes a mass flow controller 134. The mass flow controller 134 is fluidly coupled to the first outlet 120 of the membrane test cell 110. The mass flow controller 134 senses a mass flow rate of the retentate 122. In some cases, the mass flow controller 134 controls the mass flow rate of the retentate 122 according how the membrane test assembly 100 is operated, that is, depending on the type of analysis to be performed by the membrane test assembly 100.

The membrane test assembly 100 has a first three-way valve 136. The first three-way valve 136 is fluidly coupled to the mass flow controller 134. The three-way valve 136 directs the pressurized fluid 106 to either vent to an atmosphere 144 or flow to a gas chromatograph 146, described below, for analysis of the gas composition. The first three-way valve 136 prevents interruption of the experiment and allows the flow of pressurized fluid 106 to continuously running.

The membrane test assembly 100 has a mass flow meter 138. The mass flow meter 138 is one type of test instrument used in the membrane test assembly 100. The mass flow meter 138 is fluidly coupled to the mechanical shutdown valve 102. The mass flow meter 138 senses a mass flow rate of the permeate 130 flowing from the outlet portion 126 of the membrane test cell 110 through the mechanical shutdown valve 102. When a pressure of the permeate 130 exceeds a mass flow meter pressure threshold, the mass flow meter 138 can become damaged. For example, the mass flow meter pressure threshold can be 160 psig. The mechanical shutdown valve 102 operates to protect the mass flow meter 138 from an over pressure condition, that is, from the pressure of the permeate 130 exceeding the mass flow meter pressure threshold of 160 psig.

The membrane test assembly 100 has a second three way valve 140. The second three way valve 140 is fluidly coupled to the mass flow meter 138. The second three way valve 140 operates to reduce the pressure of the permeate 130 below the mass flow meter pressure threshold. The second three way valve 140 has a vent 142. The second three way valve 140 actuates to flow the permeate 130 to the atmosphere 144 when the pressure of the permeate 130 exceeds the mass flow meter pressure threshold to reduce the pressure of the permeate 130 below the mass flow meter pressure threshold. Flowing the permeate 130 to the atmosphere 144 results in a loss of the pressurized fluid 106 from the membrane test assembly 100. In some cases, flowing the permeate 130 to the atmosphere 144 can pollute the environment and harm personnel.

The membrane test assembly 100 has a gas chromatograph 146. The gas chromatograph 146 is another type of test instrument used in the membrane test assembly 100. The gas chromatograph 146 is fluidly coupled to the second three way valve 140. The permeate 130 flows from the outlet portion 126 of the membrane test cell 110 through the mechanical shutdown valve 102, the mass flow meter 138, the second three way valve 140 and into the gas chromatograph 146. The gas chromatograph 146 analyzes the composition of the permeate 130. When a pressure of the permeate 130 in the gas chromatograph 146 exceeds a gas chromatograph pressure threshold, the gas chromatograph 146 can become damaged. For example, the gas chromatograph pressure threshold can be 20 psig. The mechanical shutdown valve 102 operates to protect the gas chromatograph 146 from an over pressure condition, that is, from the pressure of the permeate 130 exceeding the gas chromatograph pressure threshold of 20 psig.

The mechanical shutdown valve 102 is positioned in between the membrane test cell 110 and the test instruments—the mass flow meter 138 and the gas chromatograph 146. The mechanical shutdown valve 102 stops the pressurized fluid flow to the mass flow meter 138 and the gas chromatograph 146 when a differential pressure created by the fluid flow through the mechanical shutdown valve 102 is greater than or equal to a differential pressure threshold.

The membrane test assembly 100 has a needle valve 148. The needle valve 148 is connected in between the pressure control valve 108 and the membrane test cell 110. The membrane test assembly 100 has a check valve 150. The check valve 150 is connected to the needle valve 148. The needle valve 148 and the check valve 150 can be operated to bleed the pressurized fluid 106 from the membrane test assembly 100.

Figure 3:
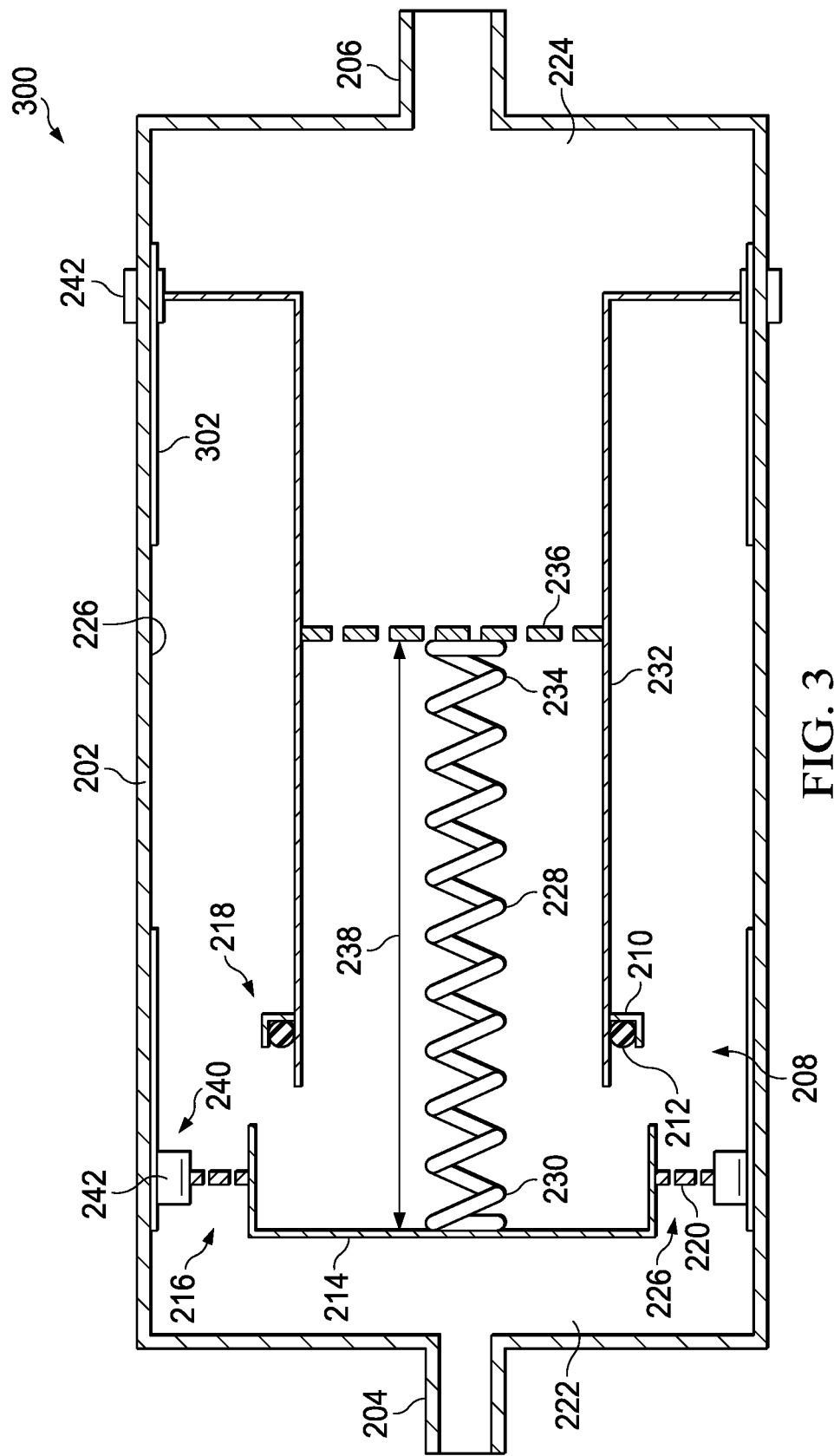
FIG. 3 is a schematic view of a mechanical shutdown valve.

FIG. 3 is a schematic view of a mechanical shutdown valve 300. Referring to FIG. 3, the mechanical shutdown valve 300 is generally similar to the mechanical shutdown valve 102 previously described. The mechanical shutdown valve 300 can be positioned in the membrane test assembly 100 to stop the fluid flow when the differential pressure created by the fluid flow through the mechanical shutdown valve 300 is greater than or equal to the differential pressure threshold. The characteristic of the spring 228 of the mechanical shutdown valve 300 is adjustable, as described below.

The mechanical shutdown valve 300 includes a second mount 302. The second mount 302 is substantially similar to the mount 240 previously described. The second mount 302 has another roller 242 disposed in another track 244 defined in the inner surface 226 of the valve body 202. The tube 232 of the valve seat 210 is connected to the valve body 202 by the second mount 302. The spring 228 is positioned inside the tube 232. The second end 234 of the spring 228 is coupled to the tube by the second mesh 236. Moving the tube in the channel 208 of the valve body 202 by the second mount 302 adjusts the length 238 of the spring 228. The length 238 is a characteristic of the spring 228 which changes the differential pressure threshold at which the diaphragm 214 engages the valve seat 210 to stop the fluid flow through the valve body 202.

Figure 4:
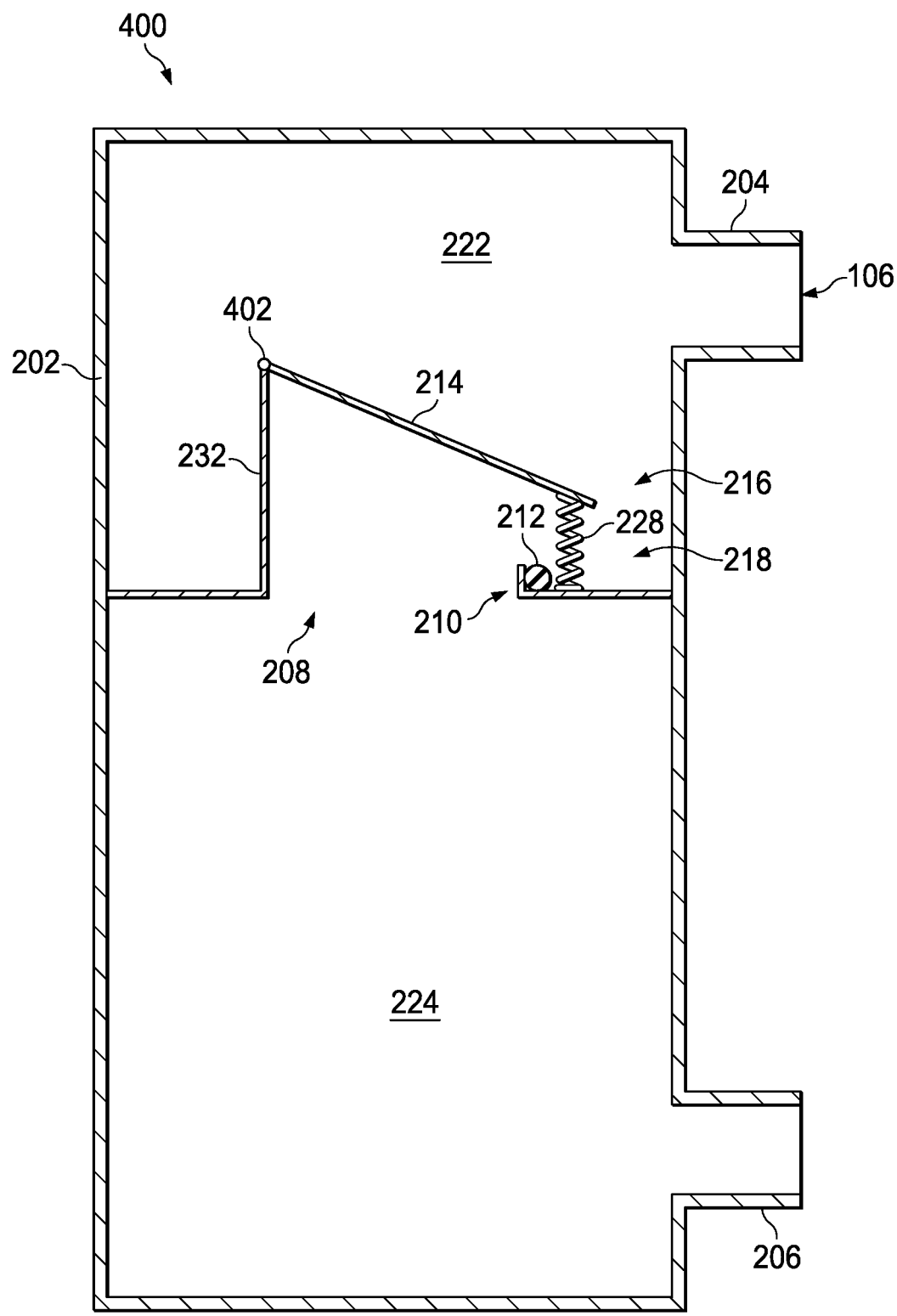
FIG. 4 is a schematic view of a mechanical shutdown valve.

FIG. 4 is a schematic view of a mechanical shutdown valve 400. The mechanical shutdown valve 400 can be positioned in the membrane test assembly 100 to stop the fluid flow when the differential pressure created by the fluid flow through the mechanical shutdown valve 400 is greater than or equal to the differential pressure threshold.

The mechanical shutdown valve 400 has a pivot joint 402. The diaphragm 214 is rotatably coupled to the tube 232 by the pivot joint 402. The diaphragm 214 rotates about the pivot joint to move from the open position 216 spaced apart from the valve seat 210 to allow the fluid flow through the valve body 202 and the closed position 218 engaging the valve seat 210 to stop the fluid flow through the valve body 202. The fluid flows through the valve body 202 from the upstream portion 222 of the channel 208 to the downstream portion 224 of the channel 208.

The pressurized fluid 106 enters the channel 208 and passes from the upstream portion 222 of the channel 208 through the spring 228 to the downstream portion 224. Once pressure reaches the differential pressure threshold, the pressurized fluid 106 will start moving the diaphragm 214 from the open position 216 towards the closed position 218 and compress the spring 228 until the diaphragm 214 fully sets on the O-ring 212. As a result of the driving force of fluid pressure fully closing the diaphragm 214 on the valve seat 210, the mechanical shutdown valve 400 will no longer allow any pressurized fluid 106 to pass through the channel 208 from the upstream portion 222 to the downstream portion 224. The threshold (actuating) pressure of the mechanical shutdown valve 400 cannot be regulated. The mechanical shutdown valve 400 operates at a fixed (preselected) pressure only (i.e., is non-adjustable).

Figure 5:
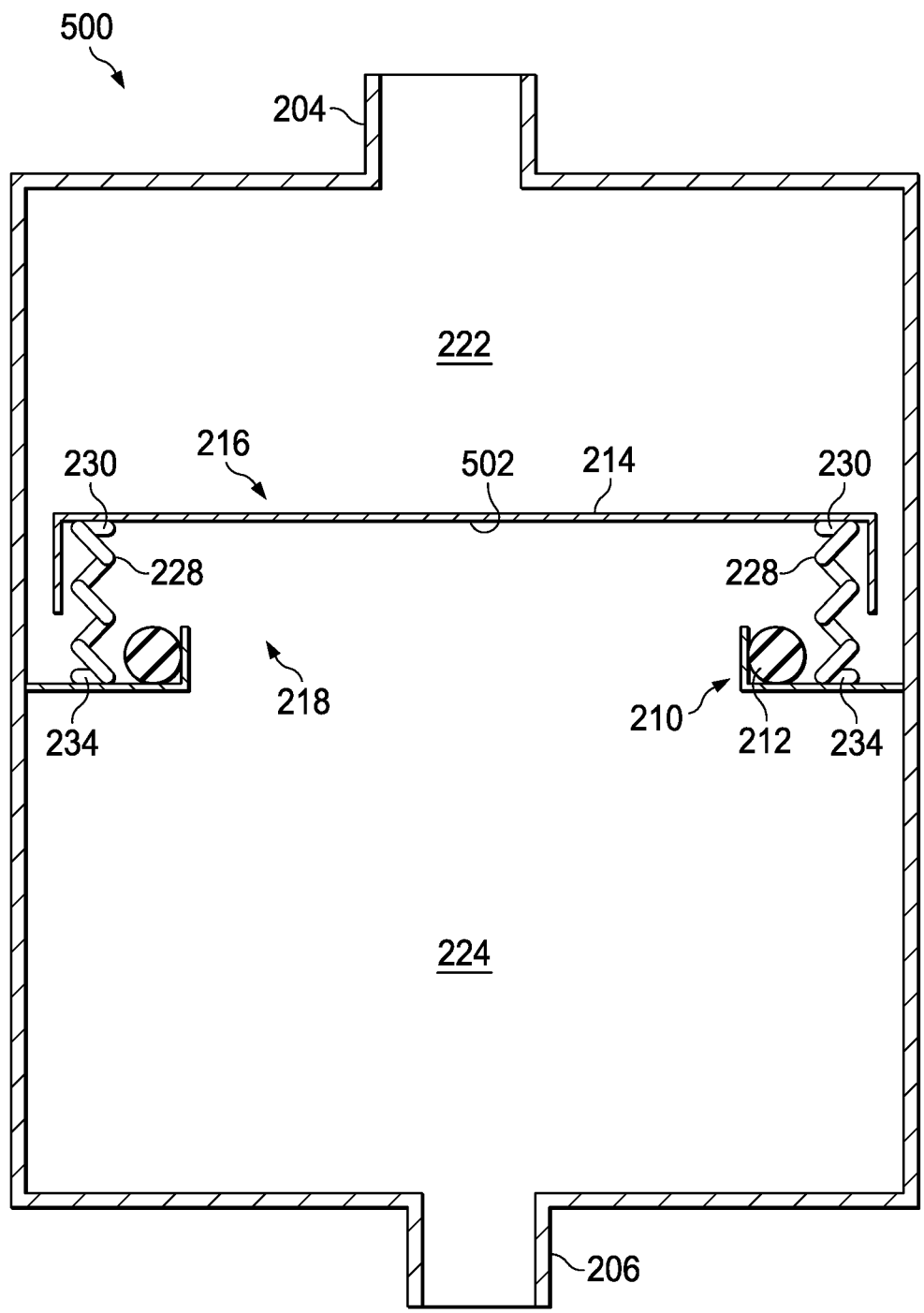
FIG. 5 is a schematic view of a mechanical shutdown valve.

FIG. 5 is a schematic view of a mechanical shutdown valve 500. The mechanical shutdown valve 500 is generally similar to the mechanical shutdown valve 102. The mechanical shutdown valve 500 can be positioned in the membrane test assembly 100 to stop the fluid flow when the differential pressure created by the fluid flow through the mechanical shutdown valve 500 is greater than or equal to the differential pressure threshold.

The mechanical shutdown valve 500 has multiple springs 228. The multiple springs 228 are substantially similar to the spring described earlier. The springs 228 are positioned in the valve body 202. The respective first ends 230 of the springs 228 are connected to a first surface 502 of the diaphragm 214. The respective second ends 230 of the springs 228 are connected to the valve seat 210.

The springs 228 biases the diaphragm 214 towards the open position 216. The diaphragm 214 compresses the spring 228 to move from the open position 216 to the closed position 218. The spring 228 can move the diaphragm 214 from the closed position 218 to the open position 216 when the differential pressure across diaphragm 214 is less than the differential pressure threshold. The fluid flows through the valve body 202 from the upstream portion 222 of the channel 208 to the downstream portion 224 of the channel 208. The diaphragm 214 moves from the open position 216 spaced apart from the valve seat 210 to allow the fluid flow through the valve body 202 to the closed position 218 engaging the valve seat 210 to stop the fluid flow through the valve body 202.

Figure 6:
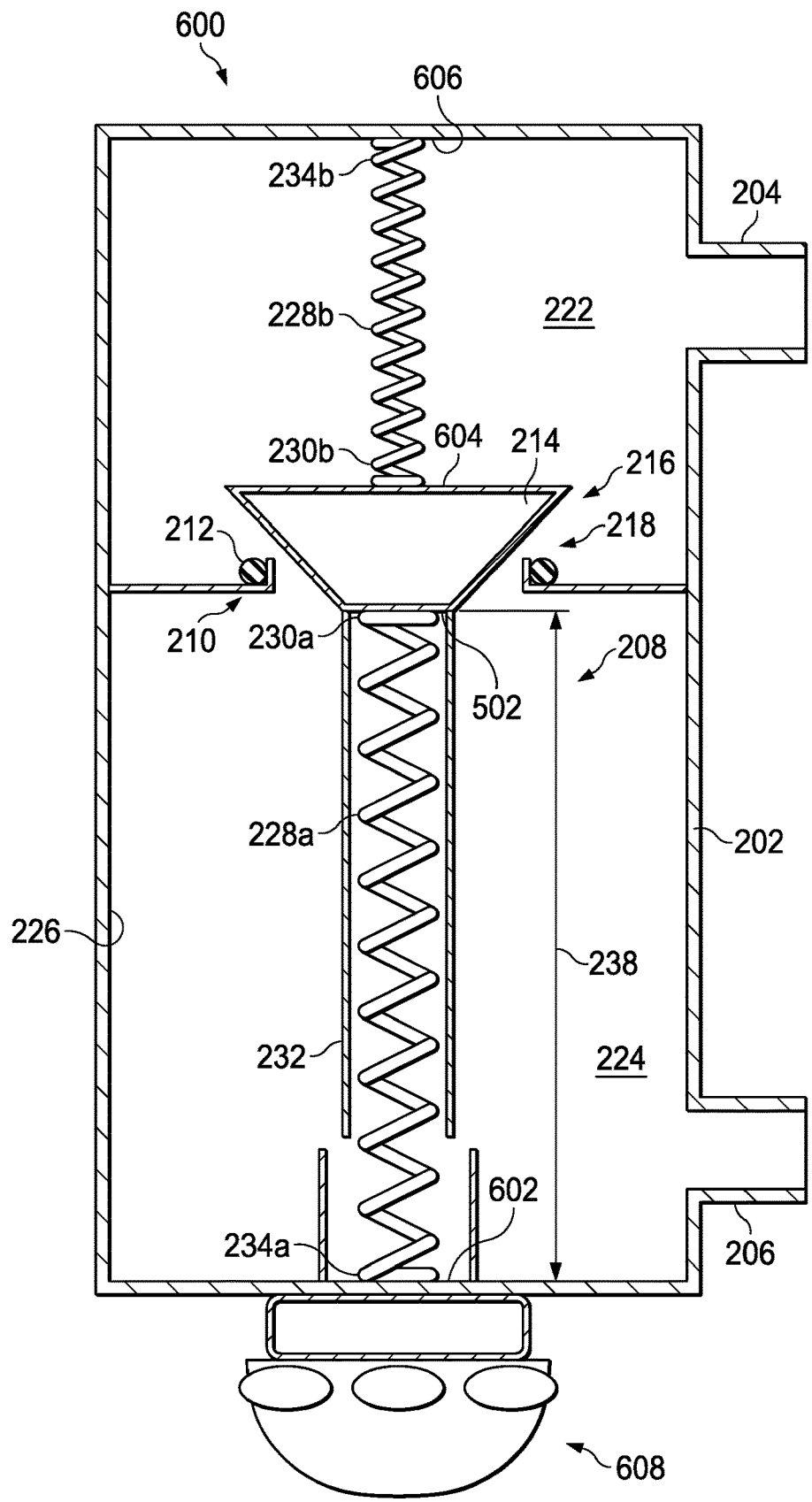
FIG. 6 is a schematic view of a mechanical shutdown valve.

FIG. 6 is a schematic view of a mechanical shutdown valve 600. The mechanical shutdown valve 600 is generally similar to the mechanical shutdown valves previously described. The mechanical shutdown valve 600 can be positioned in the membrane test assembly 100 to stop the fluid flow when the differential pressure created by the fluid flow through the mechanical shutdown valve 600 is greater than or equal to the differential pressure threshold.

The mechanical shutdown valve 600 has multiple springs 228a, 228b. Each spring 228a, 228b have a first end 230a, 230b and a second end 234a, 234b, respectively. The springs 228a, 228b are substantially similar to the spring 228 described earlier. The springs 228a, 228b are positioned in the valve body 202. The spring 228a is positioned in the tube 232. The first end 230a of the spring 228a is connected to the first surface 502 of the diaphragm 214. The second end 234a of the spring 228a is connected to a first portion 602 of the inner surface 226 of the valve body 202. The first end 230b of the spring 228b is connected to a second surface 604 of the diaphragm 214. The second end 234b of the spring 228b is connected to a second portion 606 of the inner surface 226 of the valve body 202.

The springs 228a, 228b balance to bias the diaphragm 214 towards the open position 216. The diaphragm 214 compresses the spring 228a, while extending spring 228b, to move from the open position 216 to the closed position 218. The spring 228a can expand to move the diaphragm 214 from the closed position 218 to the open position 216, while compressing spring 228b, when the differential pressure across the diaphragm 214 is less than the differential pressure threshold. The fluid flows through the valve body 202 from the upstream portion 222 of the channel 208 to the downstream portion 224 of the channel 208. The diaphragm 214 moves from the open position 216 spaced apart from the valve seat 210 to allow the fluid flow through the valve body 202 to the closed position 218 engaging the valve seat 210 to stop the fluid flow through the valve body 202.

The mechanical shutdown valve 600 has a rotatable cap 608. The rotatable cap 608 is positioned on an outer surface 610 of the valve body 202. The rotatable cap 608 is connected to the spring 228a. Rotating the rotatable cap 608 adjusts the length 238 of the spring 228a. The length 238 of the spring 228a is one of characteristics of the spring 228 which change the differential pressure threshold at which the diaphragm 214 engages the valve seat 210 to stop the fluid flow through the valve body 202.

Although the following detailed description contains many specific details for purposes of illustration, it is understood that one of ordinary skill in the art will appreciate that many examples, variations, and alterations to the following details are within the scope and spirit of the disclosure. Accordingly, the example implementations described herein and provided in the appended figures are set forth without any loss of generality, and without imposing limitations on the claimed implementations.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The invention claimed is:

1. A shutdown valve comprising:
a valve body having an inlet, an outlet, and a channel extending from the inlet to the outlet;
a valve seat positioned in the valve body;
a diaphragm positioned in the valve body, the diaphragm is movable between an open position spaced apart from the valve seat to allow a fluid flow through the valve body and a closed position engaging the valve seat to stop the fluid flow through the valve body;
a mesh coupled to the diaphragm such that the mesh and the diaphragm separate an upstream portion of the channel from a downstream portion of the channel, the mesh extending from the diaphragm to an inner surface of the valve body and limiting fluid flow between the diaphragm and the valve body;
a mount coupled to the inner surface of the valve body and the mesh, the mount movable along the inner surface of the valve body responsive to the fluid flow; and
a spring biasing the diaphragm towards the open position, wherein a characteristic of the spring determines a differential pressure threshold between the upstream portion of the channel and a downstream portion of the channel at which the diaphragm engages the valve seat.

2. The shutdown valve of claim 1, wherein the mount comprises a roller disposed in a track defined in the inner surface of the valve body.

3. The shutdown valve of claim 1, wherein the mount comprises a guide rail positioned on the inner surface of the valve body.

4. The shutdown valve of claim 1, wherein the diaphragm compresses the spring to move from the open position to the closed position.

5. The shutdown valve of claim 1, wherein the characteristic of the spring is one of at least a spring constant, a spring length, or a spring material.

6. The shutdown valve of claim 5, wherein the spring length or the spring constant is adjustable.

7. The shutdown valve of claim 1, wherein the spring moves the diaphragm from the closed position to the open position when a differential pressure across the mesh is less than the differential pressure threshold.

8. The shutdown valve of claim 1, wherein the mesh is a first mesh and a first end of the spring is coupled to the diaphragm, the shutdown valve further comprises a second mesh, the second mesh fixed to the valve seat and a second end of the spring.

9. The shutdown valve of claim 1, wherein the valve seat comprises a tube positioned in the valve body, the diaphragm stopping the fluid flow through the valve body when the diaphragm contacts the tube.

10. The shutdown valve of claim 9, wherein the spring is positioned inside the tube.

11. The shutdown valve of claim 9, further comprising a second mount coupling the tube to the valve body.

12. The shutdown valve of claim 11, wherein moving the tube by the second mount adjusts a length of the spring.

13. A membrane test assembly comprising:
a pressure source to flow a fluid;
a membrane test cell fluidly coupled to the pressure source receive the fluid and to hold a membrane;
a test instrument fluidly coupled to an outlet of the membrane test cell to perform a test on a membrane; and
a mechanical shutdown valve positioned in between the membrane test cell and the test instrument, the mechanical shutdown valve configured to stop a fluid flow to the test instrument when a differential pressure created by the fluid flow through the mechanical shutdown valve is greater than or equal to a differential pressure threshold, the mechanical shutdown valve comprising:
a diaphragm movable between an open position to allow a fluid flow and a closed position to stop the fluid flow through the mechanical shutdown valve;

a mesh coupled to the diaphragm, the mesh extending from the diaphragm to an inner surface of the mechanical shutdown valve such that the mesh and the diaphragm limit fluid flow between the diaphragm and the inner surface;

a mount coupled to the inner surface of the valve body and the mesh, the mount movable along the inner surface of the valve body responsive to the fluid flow; and a spring biasing the diaphragm towards the open position, wherein a characteristic of the spring determines the differential pressure threshold at which the diaphragm stops the fluid flow through the mechanical shutdown valve.

14. The membrane test assembly of claim 13, the mechanical shutdown valve further comprising:

a valve body having an inlet, an outlet, and a channel extending from the inlet to the outlet; and a valve seat positioned in the valve body;

wherein the diaphragm is positioned in the valve body, the diaphragm movable between the open position spaced apart from the valve seat to allow the fluid flow through the valve body and the closed position engaging the valve seat to stop the fluid flow through the valve body; and the characteristic of the spring determines the differential pressure threshold between an upstream portion of the channel and a downstream portion of the channel at which the diaphragm engages the valve seat.

15. The membrane test assembly of claim 14, wherein the mesh is coupled to the diaphragm such that the mesh and the diaphragm separate the upstream portion of the channel from the downstream portion of the channel, the mesh extending from the diaphragm to the inner surface of the valve body and limiting fluid flow between the diaphragm and the valve body.

16. The membrane test assembly of claim 15, wherein the mesh is a first mesh and the mount is a first mount, the first mount coupled to the inner surface of the valve body and the first mesh, the first mount movable along the inner surface of the valve body; the mechanical shutdown valve further comprises a second mount coupled to the inner surface of the valve body and the valve seat comprising a tube, wherein the spring is positioned in the tube and coupled to the tube by a second mesh.

* * * * *